E. B. PRENDERGAST.
FLAT IRON HEATER.
APPLICATION FILED APR. 23, 1909.
930,417.
Patented Aug. 10, 1909.
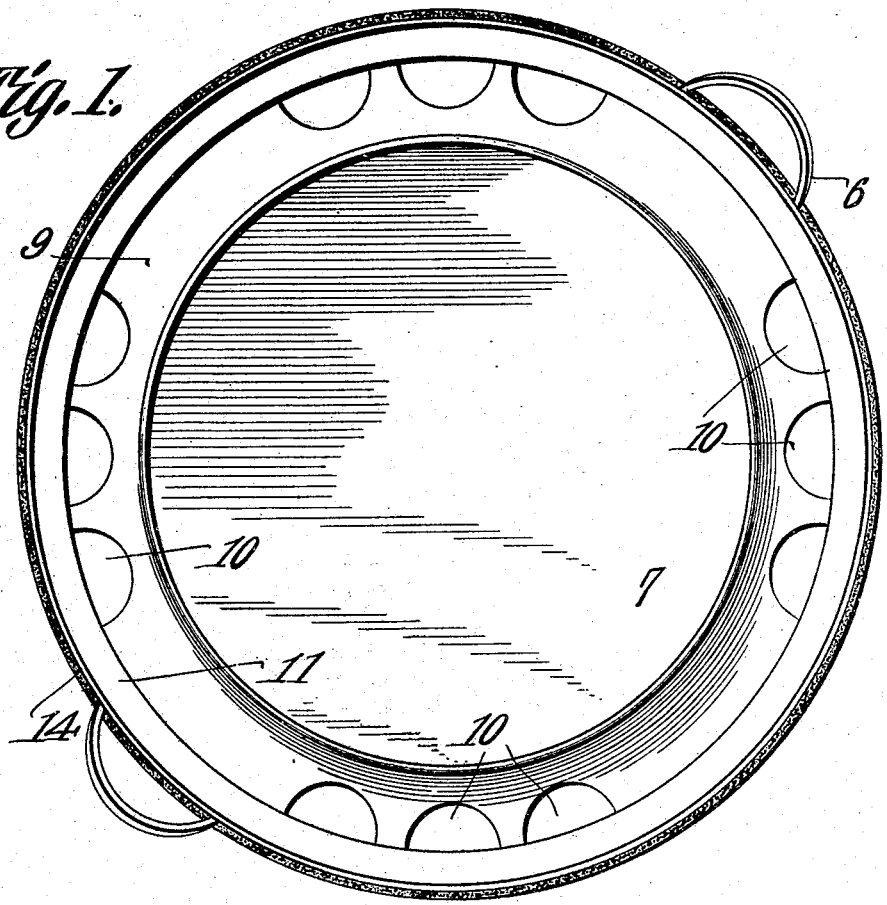
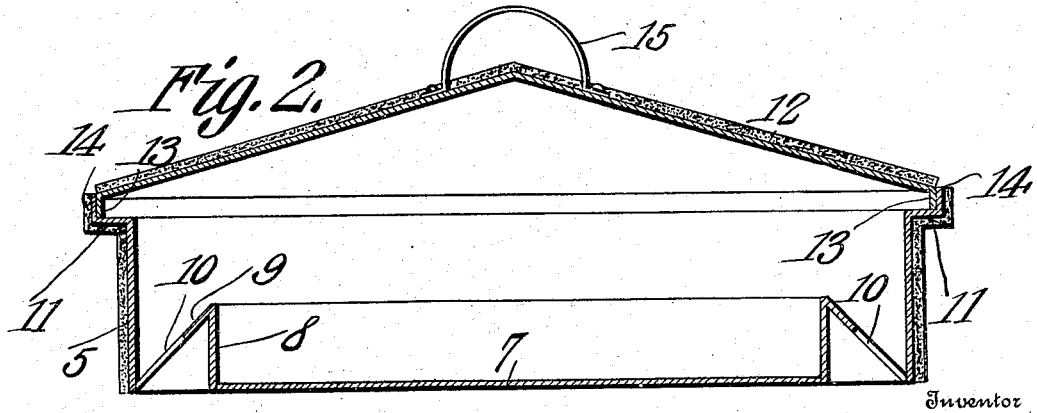
Inventor
Effie B. Prendergast.
Witnesses

UNITED STATES PATENT OFFICE.

EFFIE B. PRENDERGAST, OF SCRANTON, PENNSYLVANIA.

FLAT-IRON HEATER.

No. 930,417.     Specification of Letters Patent.     Patented Aug. 10, 1909.

Application filed April 23, 1909. Serial No. 491,737.

*To all whom it may concern:*

Be it known that I, EFFIE B. PRENDERGAST, a citizen of the United States, residing at Scranton, in the county of Lackawanna and State of Pennsylvania, have invented a new and useful Flat-Iron Heater, of which the following is a specification.

In heating flat irons in a vessel or inclosure placed over a gas or other burner, much of the heat from the flame passes upwardly around the sides of the vessel, and is therefore lost, and having this defect in mind, and for the purpose of remedying the same, the device which is the subject of the present invention has been designed.

The invention has for its object to provide a heater which is simple in structure, so that it may be easily and cheaply manufactured, and also to provide a structure by which the passage of the heat into the interior thereof is assured.

With the foregoing objects in view, the invention consists in a novel construction and arrangement of parts to be hereinafter described and claimed, reference being had to the drawing hereto annexed forming a part of this specification, in which drawing—

Figure 1 is a plan view of the heater with the cover removed. Fig. 2 is a transverse sectional view of the heater with the cover in place.

As shown in the drawings, the heater comprises a cylindrical vessel 5 to the side walls of which are attached handles 6 for convenience in carrying the same. The vessel is provided with a closed bottom 7 which, however, does not extend to the side wall thereof, but is spaced a short distance therefrom. From the outer edge of this bottom rises an annular flange 8 extending upwardly into the vessel a suitable distance. The irons to be heated are placed in the vessel on the bottom 7 within the space inclosed by the flange 8. Between the upper edge of the flange 8 and the lower edge of the side wall of the vessel extends an inclined wall 9 provided with openings 10. By this inclined wall and the upstanding flange, there is formed an annular inwardly extending channel in the bottom of the vessel, the wall of said channel formed by the flange 8 being perpendicular, and the wall 9 being inclined. At the upper edge of the vessel is an outstanding flange or ledge 11, which supports a cover 12. Said cover is in the shape of a cone, and has at its base a depending flange 13 which seats on the flange 11. From the outer edge of the flange 11 rises an annular flange 14 within which the flange 13 snugly fits, whereby a tight closure is effected. The cover is provided with a handle 15.

In use, the vessel is placed directly over the burner, the irons being placed in the vessel on the bottom 7 within the space inclosed by the flange 8. The heat from the burner passes upwardly through the openings 10 into the vessel, and upon striking the conical cover 12, is deflected downwardly upon the irons, whereby they are rapidly heated. The channel formed by the parts 8 and 9, effectively prevents the escape of the heat up the sides of the vessel, and there is consequently no waste of heat, it all passing through the openings 10 into the vessel. The invention therefore effectually serves the purpose for which it is designed, and inasmuch as it is simple in structure, it can be easily and cheaply manufactured. The lower edge of the side wall of the vessel extends flush with the bottom 7, by reason of which the bottom will be close to the flame when the device is in use. The cover and side walls of the vessel will have a covering of asbestos 16.

What is claimed is:

1. A heater comprising a vessel, a flange rising from the bottom of the vessel on the inside thereof, said bottom of the vessel on the inside of the flange being flat and of sufficient area to support a sad iron, and a perforated wall extending from the top of the flange to the side wall of the vessel, and a closure for the vessel.

2. A heater comprising a vessel, a flange rising from the bottom of the vessel on the inside thereof, said bottom of the vessel on the inside of the flange being flat and of sufficient area to support a sad iron, a perforated wall extending from the top of the flange at an inclination to the lower edge of the side wall of the vessel, and a closure for the vessel.

In testimony that I claim the foregoing as my own, I have hereto affixed my signature in the presence of two witnesses.

EFFIE B. PRENDERGAST.

Witnesses:
  HARRIETT K. BATCHELLER,
  S. CATHARINE POLLOCK.